US007279530B2

(12) United States Patent
Higashira et al.

(10) Patent No.: US 7,279,530 B2
(45) Date of Patent: Oct. 9, 2007

(54) METHOD FOR PRODUCING LOW FRICTION FLUORINE RUBBER CROSSLINKED BODY

(75) Inventors: Toshihiro Higashira, Kanagawa (JP); Hiroyuki Sano, Kanagawa (JP); Kenichi Fujimoto, Kanagawa (JP)

(73) Assignee: NOK Corporation, Tokyo (JP)

( * ) Notice: Subject to any disclaimer, the term of this patent is extended or adjusted under 35 U.S.C. 154(b) by 194 days.

(21) Appl. No.: 10/553,759

(22) PCT Filed: Apr. 21, 2004

(86) PCT No.: PCT/JP2004/005683

§ 371 (c)(1), (2), (4) Date: Oct. 20, 2005

(87) PCT Pub. No.: WO2004/094479

PCT Pub. Date: Nov. 4, 2004

(65) Prior Publication Data

US 2006/0217491 A1 Sep. 28, 2006

(30) Foreign Application Priority Data

Apr. 21, 2003 (JP) ............................ 2003-115490

(51) Int. Cl.
*C08F 8/00* (2006.01)

(52) U.S. Cl. ................... 525/326.3; 525/369; 528/481; 528/503

(58) Field of Classification Search ............. 525/326.3, 525/369; 528/481, 503
See application file for complete search history.

(56) References Cited

U.S. PATENT DOCUMENTS 4,496,682 A 1/1985 Schmiegel .................. 524/545
5,237,049 A * 8/1993 Cavanaugh et al. ........ 528/491
2003/0065067 A1 4/2003 Miwa ........................ 524/100

FOREIGN PATENT DOCUMENTS

| | | | |
|---|---|---|---|
| JP | 62-190244 | | 8/1987 |
| JP | 1-306454 | | 12/1989 |
| JP | 2-209942 | | 8/1990 |
| JP | 2-261850 | | 10/1990 |
| JP | 3-234752 | | 10/1991 |
| JP | H04-37094 | B | 6/1992 |
| JP | H05239300 | | 9/1993 |
| JP | 5-287152 | | 11/1993 |
| JP | H06248145 | | 9/1994 |
| JP | H06306180 | | 11/1994 |
| JP | H07-3099 | A | 1/1995 |
| JP | H07-3100 | A | 1/1995 |
| JP | H07-82449 | A | 3/1995 |
| JP | 7-316376 | | 12/1995 |
| JP | 8-87842 | | 4/1996 |
| JP | H09100119 | | 4/1997 |
| JP | 2653340 | | 5/1997 |
| JP | 20034379 | A | 2/2000 |
| JP | 3063172 | | 5/2000 |
| JP | 2001192482 | | 7/2001 |
| JP | 2001192482 | A | 7/2001 |
| JP | 3222054 | | 8/2001 |
| JP | 2002212370 | | 7/2002 |
| JP | 2002293950 | | 10/2002 |

* cited by examiner

*Primary Examiner*—Bernard Lipman
(74) *Attorney, Agent, or Firm*—Jacobson Holman PLLC

(57) ABSTRACT

A fluororubber composition includes a polyol-crosslinkable fluororubber, a crosslinking accelerator, a polyol crosslinking agent and calcium hydroxide, with the crosslinking accelerator having a specific weight ratio relative to the polyol crosslinking agent, and is heat treated under specific conditions to give a low-friction fluororubber crosslinked product that is well balanced and excellent in properties such as low frictional properties, low tackiness and low resilience properties and that is favorably employed as rubber vibration insulators and impact-absorbing stoppers represented by HDD stoppers.

13 Claims, 4 Drawing Sheets

METHOD FOR PRODUCING LOW FRICTION FLUORINE RUBBER CROSSLINKED BODY

This is a nationalization of PCT/JP2004/005683 filed 21 Apr. 2004 and published in Japanese.

FIELD OF THE INVENTION

The present invention relates to a process for producing a low-friction fluororubber crosslinked product, more particularly to a process for producing a low-friction fluororubber crosslinked product well balanced and excellent in properties such as low frictional properties, low tackiness and low resilience properties and favorably employed for fabrication of parts including rubber vibration insulators and impact-absorbing stoppers, particularly parts for HDD (hard disk drive) head controllers. The invention further relates to uses of a low-frication fluororubber crosslinked product obtained by the process.

BACKGROUND OF THE INVENTION

Fluororubbers possess rubber elasticity, an inherent characteristic in common with other general-purpose rubbers, and are superior to the general-purpose rubbers in properties such as resistance to heat, oil and chemicals. Such properties provide various applications, including leakproof rubber parts represented by O-rings, packings and gaskets, rubber vibration insulators, belts and rubber-coated fabrics, as well as impact-absorbing stoppers for printer head controllers and HDD (hard disk drive) head controllers, more particularly stoppers fitted in HDD to prevent a malfunction of a reading arm.

The conventional fluororubbers have surface tackiness and high friction coefficient, and therefore the processing thereof often involves tack eliminating treatment on the crosslinked rubber surface. This increases the treatment cost.

The use of conventional fluororubbers as stoppers of storage devices in hard disk drives (HDD) causes a malfunction by the tackiness of the stopper to the arm. Furthermore, their damping properties are greatly dependent on temperature and the impact resilience is increased at high temperatures such that the stoppers do not absorb the vibration of the arm. As used herein, the stoppers are parts that define the range of movement (swing) to which an arm having a reading head at the tip can move from a standby position and that absorb the impact to prevent a malfunction of the arm after operation or standby.

Meanwhile, recent rubber stoppers that are increasingly used include magnet holder-type stoppers that incorporate a magnet in the rubber to fix the arm by magnetic attraction, and crush stop-type stoppers arranged on both sides of the arm. Performances required for such stoppers are mainly the following three:

(1) The stoppers exhibit excellent impact-absorbing properties when the arm collides therewith.

(2) The rubber stopper holds an arm end portion (metal) in close contact by the magnetic force or the like during standby but does not adhere thereto.

(3) The stoppers are clean.

The stoppers of common fluororubbers are generally satisfactory in terms of (1) the impact-absorbing properties and (3) the cleanness, but they have high tackiness and fail to satisfy the required performance (2).

To satisfy the required performance (2), JP-B-H04-37094 proposes a method in which the rubber surface is impregnated with a solution of a crosslinking agent and a crosslinking accelerator for fluororubber to perform re-crosslinking and thereby the surface tackiness is eliminated. This method, however, uses a large amount of solvent and is undesirable in view of adverse effects on the environment. Moreover, the solvent limits the impregnation, so that products, for example stoppers, have variations in performance and some cause a malfunction of HDD.

The present inventors studied diligently in order to solve the aforesaid problems, and have arrived at an uncrosslinked fluororubber composition that comprises a polyol-crosslinkable fluororubber in combination with a specific crosslinking agent, crosslinking accelerator, calcium hydroxide and optionally magnesium oxide, wherein the crosslinking accelerator has a weight ratio (R) to the crosslinking agent (crosslinking accelerator/crosslinking agent) in the range of 0.9 to 5, and that when heat treated under specific conditions (the heat treatment may be preceded by polyol crosslinking and preforming according to need), the crosslinking accelerator in the fluororubber composition (or a preform) favorably migrates to the superficial layer to increase the crosslinking density of the rubber surface such that the rubber surface displays reduced frictional properties and tackiness and the fluororubber formed product exhibits low impact resilience.

Specifically, the present inventors have found that the greater the crosslinking accelerator (such as an organic quaternary phosphonium salt)/crosslinking agent ratio is within the range of 0.9 to 5, the larger the amount of the crosslinking accelerator migrating to the rubber surface, with the result that the crosslinking density increases in the surface of rubber formed product while that of the entire rubber formed product decreases, leading to lowered impact resilience.

The present inventors have also found that the fluororubber composition in which the crosslinking accelerator (such as an organic quaternary phosphonium salt)/crosslinking agent ratio is higher than in the traditional fluororubber compositions can give a low-friction fluororubber crosslinked product that is well balanced and improved in properties such as low frictional properties, low tackiness and low resilience properties and is favorably employed for fabrication of parts including leakproof rubber parts represented by O-rings, packings and gaskets, rubber vibration insulators, belts, rubber-coated fabrics, and impact-absorbing stoppers as stoppers in HDD. The present invention has been completed based on these findings.

Known technologies related to the polyol vulcanization of fluororubbers include the following.

JP-B-H04-37094 discloses a process of surface modification of a fluorine-containing elastomer formed product wherein a surface of a vulcanized fluorine-containing elastomer formed product is impregnated with a crosslinking (vulcanizing) agent polyhydroxy compound and optionally a vulcanization accelerating promoter (crosslinking accelerator) to perform re-vulcanization. This surface modification process is described to provide non-tackiness and low frictional properties in the surface of vulcanized fluorine-containing elastomer formed product.

However, the process employs a surface treatment solution of the crosslinking agent and crosslinking accelerator in an organic solvent such as acetone for impregnating the surface with the crosslinking agent polyhydroxy compound and vulcanization accelerating promoter (crosslinking accel erator). The use of organic solvent possibly leads to environmental pollution. Moreover, the surface treatment after vulcanization adds a process to increase the cost.

JP-A-H07-3099 discloses a fluororubber composition comprising (A) 100 parts by weight of a fluororubber obtained by copolymerizing vinylidene fluoride, hexafluoropropylene and optionally tetrafluoroethylene, (B) 0.05 to 2 parts by weight of an organic quaternary phosphonium salt, (C) 0.01 to 3 parts by weight of a nitrogen-containing organic compound and/or a phosphorous-containing organic compound, (D) 0.1 to 10 parts by weight of a polyhydroxy compound, and (E) 0.5 to 30 parts by weight of a metal oxide and/or a metal hydroxide. It is described that the composition may be preformed into a desired shape, be placed in a mold, and be compression molded under heating to perform polyol vulcanization, giving a vulcanized fluororubber formed product. The thus-formed product is described to maintain mechanical characteristics and be free of forming failure during the vulcanization forming.

However, the formed products disclosed in Examples of the patent document show insufficient migration of the organic quaternary phosphonium salt to the surface of rubber formed product, and consequently have high friction coefficient and tackiness.

JP-A-H07-3100 discloses a fluororubber composition comprising (A) 100 parts by weight of a fluororubber obtained by copolymerizing vinylidene fluoride, hexafluoropropylene and optionally tetrafluoroethylene, (B) 0.05 to 2 parts by weight of an organic quaternary phosphonium salt, (C) 0.01 to 3 parts by weight of an organic quaternary ammonium hydrogen sulfate, (D) 0.1 to 10 parts by weight of a polyhydroxy compound, and (E) 0.5 to 30 parts by weight of a metal oxide and/or a metal hydroxide. It is described that the composition may be preformed into a desired shape, be placed in a mold, and be compression molded under heating to perform polyol vulcanization, giving a vulcanized fluororubber formed product. The thus-formed product is described to have good mechanical properties and be free of forming failure during the vulcanization forming.

However, as in the case of the above patent document 2, the formed products disclosed in Examples of this patent document show insufficient migration of the organic quaternary phosphonium salt to the surface of rubber formed product, and consequently have high friction coefficient and tackiness.

JP-A-H07-82449 discloses a polyol-vulcanizable fluororubber composition comprising a polyol-vulcanizable fluororubber and a compound analogous to hydrotalcite. According to the patent document, vulcanization is performed in a manner such that the fluororubber is mixed with vulcanizing ingredients and the mixture is subjected to primary vulcanization by press vulcanization at 140 to 200° C. for about 2 to 120 minutes and to secondary vulcanization by oven vulcanization at about 150 to 250° C. for about 0 to 30 hours. The vulcanizing ingredients mentioned in the patent document include the following, which are used in the amounts described per 100 parts by weight of the fluororubber: a vulcanizing agent (e.g., a polyhydroxy aromatic compound) used in an amount of 0.5 to 10 parts by weight, an acid receiver (e.g., a bivalent metal oxide or hydroxide) used in an amount of 1 to 20 parts by weight, and a vulcanization accelerator (e.g., a quaternary ammonium or phosphonium salt) used in an amount not more than 10 parts by weight. The composition is described to have good mold releasability, excellent vulcanization properties and improved engine oil resistance.

However, the formed products disclosed in Examples of this patent document show insufficient migration of the vulcanization accelerator (such as a quaternary phosphonium salt) to the surface of rubber formed product, and consequently have high friction coefficient and tackiness. Moreover, the use of the vulcanization accelerator, such as an organic quaternary phosphonium salt, in an increased amount in combination with the hydrotalcite-analogous compound as described in the patent document results in a higher crosslinking rate such that the composition is crosslinked before being poured into a mold in the press molding and cannot be formed into a desired shape.

JP-A-2000-34379 discloses a fluororubber composition comprising a raw-material fluororubber, a polyol vulcanizing agent, an organic promoter, a vulcanization supplement accelerator, an acid receiver and optionally a filler, wherein the vulcanization supplement accelerator is calcium hydroxide that is treated with a fatty acid ester or the like and has an average particle diameter of not more than 7.5 μm and a specific surface area of not less than 20 $m^2/g$. The composition is described to give a vulcanized product excellent in resistance to permanent compression set. According to the patent document, the vulcanization is performed in a manner such that primary vulcanization is carried out at 170° C. for 10 minutes and secondary vulcanization at 200° C. for 24 hours.

However, fluororubber formed products obtained according to this patent document have increased crosslinking density and impact resilience, presumably because of the fact that the vulcanization supplement accelerator has a high specific surface area and is treated with a fatty acid ester or the like. Moreover, the formed products show insufficient migration of the organic accelerator (vulcanization accelerator) such as an organic quaternary phosphonium salt to the surface of rubber formed product. Furthermore, Examples in this patent document result in high friction coefficient and tackiness.

JP-A-2001-192482 discloses a process in which a fluororubber composition is vulcanized and formed in the presence of a polyol vulcanizing agent and is heat treated at a temperature of about 250 to 300° C. to give a vulcanized fluororubber formed product having superior properties such as resistance to permanent compression set, wherein the fluororubber composition comprises 100 parts by weight of a fluororubber, 0.5 to 3 parts by weight of calcium hydroxide, 4 to 15 parts by weight of magnesium oxide, and 10 to 50 parts by weight of thermal black and a bituminous coal filler combined. The process employs the polyol vulcanizing agent, such as a polyhydroxy aromatic compound, in an amount of about 0.5 to 10 parts by weight per 100 parts by weight of the fluorine-containing rubber, and an ammonium or phosphonium salt in an amount of about 0.1 to 30 parts by weight. According to the patent document, the fluororubber composition is vulcanized and formed using a compression press or the like at about 150 to 230° C. for about 1 to 30 minutes; the products for use as grommets and seal packings are further heat treated (secondary vulcanization) at about 250 to 300° C. for about 5 to 48 hours in an air oven or the like.

However, the formed products disclosed in this patent document have high impact resilience, and show insufficient migration of the organic quaternary phosphonium salt to the rubber surface and consequently exhibit high friction coefficient and tackiness.

The fluororubber compositions and vulcanized formed products thereof proposed so far further include the following.

Japanese Patent No. 3063172 (corresponding to JP-A-H04-236254) discloses a fluororubber composition comprising 100 parts by weight of a fluororubber and 0.5 to 10 parts by weight of a liquid hydrocarbon rubber selected from liquid polyisoprene rubbers and hydrogenated liquid polyisoprene rubbers. The composition is described to be excellent in processability such as extrusion properties and in vulcanized rubber properties.

Japanese Patent No. 3222054 (corresponding to JP-A-H09-208751) discloses a rubber composition comprising (A) a fluororubber polymer, (B) a wax containing a fluorine-containing organic group and having a melting point of 30 to 200° C., and (C) a crosslinking agent selected fromamines, polyols and peroxides. The rubber composition is described to possess excellent workability, kneading processability and mold releasability, and to give a formed product comparable in properties to the existing products.

Japanese Patent No. 2653340 (corresponding to JP-A-H06-293850) discloses a fluororubber composition comprising (A) a polyol-crosslinkable fluororubber, (B) a liquid fluororubber, and (C) a polyol in which at least one OH group in the molecule is silylated. It also describes that the composition may be crosslinked at a low temperature of 130 to 160° C. (primary crosslinking) to avoid foaming, and be subjected to secondary crosslinking at a temperature of 120 to 250° C. The composition is described to be excellent in workability and to give a formed product having low hardness and widespread uses.

JP-A-H05-239300 discloses a vulcanizable fluoroelastomer composition comprising (A) an elastomer copolymer having a vinylidene fluoride unit and at least one fluorine-containing monomer unit, (B) a tertiary phosphine vulcanization accelerator, such as triphenylphosphine, substituted with an alkoxyl or phenoxy group, (C) a polyol crosslinking agent, and (D) a bivalent metal oxide or hydroxide. The composition is subjected to primary vulcanization (press vulcanization) and secondary vulcanization (oven heating) to provide a vulcanized formed product, such as a sealing material. The primary vulcanization rate is high, and the vulcanized formed product has good rubber elasticity and tensile properties.

JP-A-H06-248145 discloses a fluororubber composition comprising a fluororubber, calcium oxide and polyethylene wax, wherein the fluororubber is obtained by copolymerizing vinylidene fluoride, tetrafluoroethylene and propylene. The patent document teaches that the composition may be vulcanized at 100 to 400° C. for several seconds to 5 hours, and be subjected to secondary vulcanization at 150 to 300° C. for about 30 minutes to 48 hours to stabilize properties of the vulcanizate. According to the disclosure of the document, the composition is free of fusion failure in the vulcanization and forming, and the formed product has high heat resistance.

JP-A-H06-306180 discloses a process for producing a vulcanized fluororubber formed product, wherein a fluororubber obtained by copolymerizing vinylidene fluoride, hexafluoropropylene and optionally tetrafluoroethylene, is formed by polyol vulcanization in a mold with use of an organic quaternary ammonium salt as vulcanization accelerator. The document describes that the vulcanization forming can be performed without forming failure.

The fluororubber composition disclosed in these patent documents include a liquid hydrocarbon rubber, a wax containing a fluorine-containing organic group and having a melting point of 30 to 200° C., a liquid fluororubber, a tertiary phosphine crosslinking accelerator, calcium oxide, a polyethylene wax, or an organic quaternary ammonium salt. Vulcanized formed products from the fluororubber compositions are unsatisfactory in low tackiness, low frictional properties and low impact resilience, and in balance of such properties.

DISCLOSURE OF THE INVENTION

A process for producing a low-friction fluororubber crosslinked product according to the present invention comprises:

preliminarily polyol crosslinking a polyol-crosslinkable fluororubber composition according to need, the composition comprising a polyol-crosslinkable fluororubber in combination with a crosslinking accelerator (preferably an organic quaternary phosphonium salt), a polyol crosslinking agent (preferably a bisphenol), calcium hydroxide and optionally magnesium oxide, wherein the crosslinking accelerator has a weight ratio (R) to the polyol crosslinking agent (crosslinking accelerator/polyol crosslinking agent) in the range of 0.9 to 5, preferably 0.9 to 3, more preferably 0.9 to 2; and heat treating the fluororubber composition at a temperature in the range of 150 to 300° C., preferably 200 to 300° C., more preferably 240 to 300° C., for 0.1 to 48 hours, preferably 1 to 48 hours, more preferably 10 to 48 hours to produce a low-friction fluororubber crosslinked product having a surface frication coefficient of less than 1.

The polyol-crosslinkable fluororubber composition used in the invention preferably contains the crosslinking accelerator and the polyol crosslinking agent in amounts of 2.1 to 20 parts by weight and 0.4 to 20 parts by weight, respectively, and calcium hydroxide having a specific surface area of less than 20 $m^2/g$ in an amount of 0.5 to 10 parts by weight, per 100 parts by weight of the polyol-crosslinkable fluororubber.

The polyol-crosslinkable fluororubber composition used in the invention preferably contains the magnesium oxide in an amount of not more than 3.0 parts by weight, per 100 parts by weight of the polyol-crosslinkable fluororubber.

The polyol-crosslinkable fluororubber composition used in the invention preferably contains polytetrafluoroethylene (PTFE) in an amount of 5 to 200 parts by weight, per 100 parts by weight of the polyol-crosslinkable fluororubber.

In the present invention, the polyol-crosslinkable fluororubber composition is polyol-crosslinked using a compression mold whose inner peripheral surface is unleveled to give a crosslinked product having an uneven surface with an average depth of 0.5 to 200 μm, and the crosslinked product is subjected to the heat treatment.

When a crosslinked product from the polyol-crosslinkable fluororubber composition is to be used as a stopper in hard disk drive (HDD), the polyol crosslinking agent is preferably contained in an amount of 1 to 10 parts by weight per 100 parts by weight of the polyol-crosslinkable fluororubber, and the weight ratio R (crosslinking accelerator/polyol crosslinking agent) is preferably in the range of 0.9 to 2.

An impact-absorbing stopper represented by a HDD stopper according to the present invention is obtained by the process for producing a low-friction fluororubber crosslinked product as described above.

The crosslinked product used as HDD stopper preferably has a change of holding torque of not more than 14%.

The present invention provides an inexpensive process whereby a low-frication fluororubber crosslinked product can be produced simply by heat treating a fluororubber composition (the heat treatment may be preceded by vulcanization and preforming according to need) without surface modification with a solution containing an organic solvent thereby to reduce the environmental pollution, and wherein the low-frication crosslinked fluororubber obtained is well balanced and excellent in properties such as low frictional properties, low tackiness and low resilience properties and is favorably employed for fabrication of parts including rubber vibration insulators, impact-absorbing stoppers, fluid leak-proof rubber parts, belts, rubber-coated fabrics and wipers. The low-friction fluororubber crosslinked product according to the invention has improved and stable non-tackiness properties and can be suitably used as stoppers in HDD.

PREFERRED EMBODIMENTS OF THE INVENTION

Figure 1:
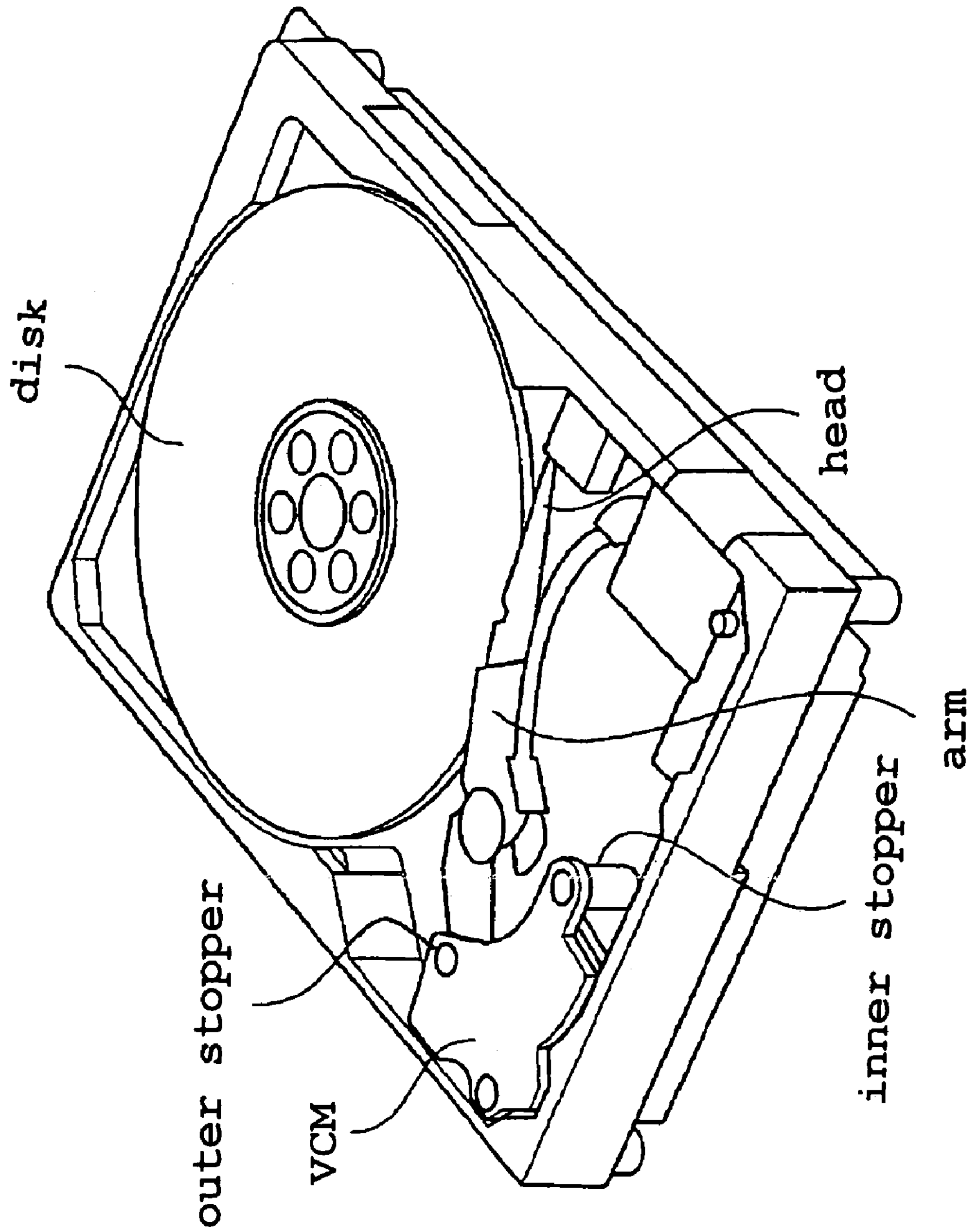
FIG. 1 is an explanatory view of a testing device used for evaluating a low-friction fluororubber crosslinked product obtained by the present process for non-tackiness durability.

The process for producing a low-friction fluororubber crosslinked product according to the present invention will be described in detail hereinbelow.

Process for Producing Low-friction Fluororubber Crosslinked Product

The process for producing a low-friction fluororubber crosslinked product according to the present invention comprises:

preliminarily polyol crosslinking a polyol-crosslinkable fluororubber composition (discussed later) according to need; and heat treating the crosslinked product (crosslinked fluororubber) at a temperature in the range of 150 to 300° C., preferably 200 to 300° C., more preferably 240 to 300° C., for 0.1 to 48 hours, preferably 1 to 48 hours, more preferably 10 to 48 hours.

Hereinbelow, the polyol-crosslinkable fluororubber composition (fluororubber composition crosslinkable with a polyol) favorably used in the invention, vulcanization conditions (of primary vulcanization and secondary vulcanization performed according to need), conditions of post-vulcanization heat treatment, and properties of the obtainable low-friction fluororubber crosslinked product will be sequentially discussed.

(Polyol-crosslinkable Fluororubber Composition)

The polyol-crosslinkable fluororubber composition (fluororubber composition crosslinkable with a polyol) suitable for use in the present invention contains a polyol-crosslinkable fluororubber, a crosslinking accelerator organic quaternary phosphonium salt, a polyol crosslinking agent represented by a bisphenol, calcium hydroxide, and optionally magnesium oxide.

Polyol-crosslinkable Fluororubber

The invention may employ one or more kinds of fluorine-containing olefin (co)polymers as the polyol-crosslinkable fluororubbers (fluororubbers crosslinkable with a polyol).

The fluorine-containing olefins include vinylidene fluoride, hexafluoropropylene, pentafluoropropylene, trifluoroethylene, trifluorochloroethylene, tetrafluoroethylene, vinyl fluoride, perfluoroacrylic esters, perfluoroalkyl acrylates, perfluoromethyl vinyl ether and perfluoropropyl vinyl ether. These fluorine-containing olefins may be used singly or in combination of two or more kinds.

Preferred polyol-crosslinkable fluororubbers ((co)polymers) include commercially available fluororubbers such as vinylidene fluoride/hexafluoropropylene binary copolymer, tetrafluoroethylene/propylene binary copolymer, and vinylidene fluoride/tetrafluoroethylene/hexafluoropropylene ternary copolymer.

Crosslinking Agent

The invention preferably employs polyol crosslinking agent bisphenols. Specific examples include polyhydroxy aromatic compounds such as 2,2-bis(4-hydroxyphenyl)propane[bisphenol A], 2,2-bis(4-hydroxyphenyl)perfluoropropane[bisphenol AF], bis(4-hydroxyphenyl)sulfone[bisphenol S], bisphenol A-bis(diphenyl phosphate), 4,4'-dihydroxydiphenyl, 4,4'-dihydroxydiphenyl methane and 2,2-bis(4-hydroxyphenyl)butane. Preferred are bisphenol A and bisphenol AF. They may be in the form of alkali metal salts or alkaline earth metal salts. Also employable as the crosslinking agents are commercially available master batches containing a raw-material rubber and a crosslinking agent, with examples including CURATIVE VC 30 (manufactured by DuPont Dow Elastomers, containing 50 wt % of crosslinking agent bisphenol AF). These crosslinking agents may be used singly or in combination of two or more kinds.

Crosslinking Accelerator

The crosslinking accelerators include those commonly used in the polyol crosslinking, such as organic quaternary phosphonium salts, active hydrogen-containing aromatic compound/quaternary phosphonium salt equimolar molecular compounds, and bivalent metal/amine complex compounds. These crosslinking accelerators may be used singly or in combination of two or more kinds. Of these crosslinking accelerators, the organic quaternary phosphonium salts are preferable in view of reduction of outgassing from the low-friction fluororubber crosslinked product.

Specific examples of the crosslinking accelerator organic quaternary phosphonium salts are described in paragraphs [0010] to [0012] of JP-A-2001-192482 to the present applicant, with triphenylbenzylphosphonium bromide and triphenylbenzylphosphonium chloride being preferred. Also employable as the crosslinking accelerators are commercially available master batches containing a raw-material rubber and a crosslinking accelerator, with examples including CURATIVE VC 20 (manufactured by DuPont Dow Elastomers, containing 33 wt % of crosslinking accelerator organic phosphonium salt).

Other Ingredients

Where necessary, the polyol-crosslinkable fluororubber composition may appropriately contain further ingredients common in the rubber industry in addition to the aforementioned, while still achieving the effects of the crosslinking agent and crosslinking accelerator used in the invention. Such ingredients include reinforcing agents such as carbon blacks and carbon fibers; fillers such as calcium carbonate, magnesiumcarbonate, aluminumhydroxide, magnesiumhydroxide, aluminum silicate, magnesium silicate, calcium silicate, potassium titanate, titanium oxide, barium sulfate, aluminum borate, glass fibers and aramid fibers; processing aids such as waxes and metallic soaps; acid receivers such as zinc oxide (excluding calcium hydroxide, the same applies hereinafter); anti-aging agents; and thermoplastic resins. Silica can provide an effect of lowering tackiness at room temperature, but increases the tackiness to metals at a high humidity, so that the nonuse of silica is sometimes preferable.

The polyol-crosslinkable fluororubber composition (fluororubber composition crosslinkable with a polyol) desirably contains the ingredients in the following amounts per 100 parts by weight of the polyol-crosslinkable fluororubber:

2.1 to 20 parts by weight, preferably 2.5 to 10 parts by weight of the crosslinking accelerator (preferably organic quaternary phosphonium salt);

0.4 to 20 parts by weight, preferably 1 to 10 parts by weight of the polyol crosslinking agent (preferably bisphenol);

not more than 3 parts by weight, preferably 1 to 3 parts by weight of magnesium oxide according to need; and 0.5 to 10 parts by weight, preferably 1 to 7 parts by weight, particularly preferably 1 to 5 parts by weight of calcium hydroxide.

Any amount of crosslinking accelerator less than the aforementioned tends to increase the friction coefficient and tackiness of the rubber surface. Any amount exceeding the aforementioned tends to result in a low-friction fluororubber crosslinked product (formed product) liable to cracks upon flexing, compressing or distorting.

Any amount of crosslinking agent less than the. aforementioned tends to cause foams after forming and the crosslinked products cannot achieve a uniform shape. Any amount exceeding the aforementioned tends to result in a low-friction fluororubber crosslinked product (formed product) liable to cracks upon flexing, compressing or distorting.

In the event that foaming occurs during the crosslinking and forming even when the crosslinking agent is used in the amount specified above, the amounts of the reinforcing agent, filler, acid receiver and crosslinking agent are increased and appropriately adjusted according to need to solve the foaming problem.

In the polyol-crosslinkable fluororubber composition, the crosslinking accelerator represented by the organic quaternary ammonium salts and organic quaternary phosphonium salts has a weight ratio (R) to the polyol crosslinking agent represented by the bisphenols (crosslinking accelerator/polyol crosslinking agent) in the range of 0.9 to 5, preferably 0.9 to 4, more preferably about 0.9 to 3, particularly preferably 0.9 to 2.

In the polyol-crosslinkable fluororubber composition, any weight ratio R (crosslinking accelerator/polyol crosslinking agent) less than the aforementioned tends to lead to insufficient migration of the crosslinking accelerator to the rubber surface, and consequently the rubber surface cannot have an adequate crosslinking density and fails to achieve desired low tackiness and low frictional properties. The weight ratio R exceeding the aforementioned can provide an increased crosslinking density of the rubber surface but tends to result in a low-friction fluororubber crosslinked product (formed product) liable to cracks upon flexing, compressing or distorting.

Excessive use of magnesium oxide (more than 3.0 parts by weight per 100 parts by weight of the uncrosslinked fluororubber) results in a formed product having high impact resilience. Further, because magnesium oxide per se exhibits tackiness to metals, the excessive use thereof causes the rubber formed product obtained to display higher tackiness to a mating metal. Furthermore, when magnesium oxide is used excessively, the crosslinking accelerator such as organic phosphonium salt makes insufficient migration to the surface of formed product, and consequently desired low friction coefficient and low tackiness cannot be achieved.

When the low-friction fluororubber crosslinked product is to be used as a stopper in hard disk drive, the crosslinking agent is contained in an amount of 0.4 to 20 parts by weight, preferably 0.4 to 10 parts by weight per 100 parts by weight of the polyol-crosslinkable fluororubber, and the weight ratio R (crosslinking accelerator/polyol crosslinking agent) is in the range of 0.9 to 2, preferably 0.9 to 1.5. When the amount of crosslinking agent and the weight ratio R are in the above ranges, the fluororubber crosslinked product obtained has excellent surface non-tackiness and stability of non-tackiness, and can be suitably used as a HDD stopper.

The lower limit of the amount of magnesium oxide may be 0 part by weight per 100 parts by weight of the uncrosslinked fluororubber. Preferably, the amount is in the range of 1 to 3.0 parts by weight, in which case the crosslinking can take place at an adequate crosslinking rate and can produce a foam-free crosslinked product (formed product) having low frictional properties and low tackiness. The amount of magnesium oxide shows a tendency similar to that of calcium hydroxide.

The use of calcium hydroxide in the above-mentioned amount provides an adequate crosslinking density and low impact resilience, and can reduce the possibility of foaming during the forming.

In general, the use of calcium hydroxide in smaller amounts tends to lead to lower crosslinking density and impact resilience, and increases the possibility of foaming during the forming.

In the event that foaming occurs during forming, an acid receiver is desirably added in an increased amount, for example in an amount of 0.5 to 10 parts by weight per 100 parts by weight of the polyol-crosslinkable fluororubber.

The use of calcium hydroxide exceeding the aforementioned range increases the crosslinking density of entire rubber product and the impact resilience, and the crosslinking accelerator makes remarkably reduced and deteriorated migration to the rubber surface and often fails to achieve low surface tackiness.

The invention can employ commercially available calcium hydroxides, preferably having a specific surface area of less than 20 $m^2/g$, as they are.

The use of calcium hydroxide with a specific surface area exceeding 20 $m^2/g$ increases the crosslinking density of entire rubber product and the impact resilience, and the crosslinking accelerator makes remarkably reduced and deteriorated migration to the rubber surface and often fails to achieve low surface tackiness.

In view of low frictional properties, low tackiness and low impact resilience, the polyol-crosslinkable fluororubber composition used in the invention may contain polytetrafluoroethylene (PTFE) in an amount of 5 to 200 parts by weight, preferably about 20 to 100 parts by weight, per 100 parts by weight of the polyol-crosslinkable fluororubber.

The polytetrafluoroethylene (PTFE) per se has superior low frictional properties, low tackiness and good impact resilience properties, and the addition thereof in the preparation of the fluororubber composition can improve low frictional properties, low tackiness and low impact resilience of formed products obtainable.

Any amount of PTFE less than the aforementioned tends to lead to a poor effect of lowering the impact resilience of formed products obtainable, and that exceeding the aforementioned tends to lead to excessively high hardness of formed products obtainable such that the rubber elasticity is lost.

Preparation and Vulcanization of Polyol-crosslinkable Fluororubber Composition

To prepare the polyol-crosslinkable fluororubber composition, a compound containing the aforementioned ingredients in the specified amounts may be kneaded using an internal kneading machine such as an internal mixer, a kneader or a Banbury mixer, or a common rubber-kneading machine such as an open roll mill. An alternative method of preparation of the composition is to dissolve the ingredients separately in solvents and to disperse them using a stirring machine or the like.

The polyol-crosslinkable fluororubber composition obtained as described above may be crosslinked (vulcanized) and formed with use of an injection molding machine, a compression molding machine, a vulcanizing press or an oven, at a temperature of 140 to 230° C. for about 1 to 120 minutes (primary vulcanization). The primary vulcanization is a step in which the composition is crosslinked to an extent such that a specific shape can be maintained (preforming). For a complicated shape, the preforming preferably involves a mold. The primary vulcanization may be performed with an air oven or the like.

In the present invention, the polyol-crosslinkable fluororubber composition may be polyol-crosslinked, particularly in the primary vulcanization, using a compression mold as the vulcanizing press or in combination with the vulcanizing press, wherein the inner peripheral surface of the mold is unleveled to a certain depth to give a crosslinked product having an uneven surface with a desired depth (e.g., 0.5 to 200 μm). The crosslinked product having an uneven surface with an average depth of 0.5 to 200 μm can exhibit improved low frictional properties and low tackiness.

After kneaded, the polyol-crosslinkable fluororubber composition is compression molded as described later. The kneaded composition may: (a) be cooled to room temperature, then reheated and compression molded; or (b) be heated continuously from the kneading and compression molded. The compression processing with a compression molding machine generally adopts the step (a) for a processing reason.

For the production of fluororubber formed products such as rubber hoses, the kneaded fluororubber composition is extruded into a tube and is subjected to oven vulcanization, in which case the step (b) is adopted.

Shaping the polyol-crosslinkable fluororubber composition into a desired shape before vulcanization permits production of a low-friction and low-tackiness formed product by whichever (a) or (b). The levels of low frictional properties and low tackiness of the fluororubber crosslinked product is affected not by the temperature rise pattern or curve for heat treatment but by the temperature and time of the heat treatment.

The heat treatment method in the invention may be similar to that for ordinary secondary vulcanization. But ordinary secondary vulcanization cannot achieve low frictional properties and low tackiness unless the composition is as described in the invention (polyol-crosslinkable fluororesin composition). With the conventional fluororubbers, the secondary vulcanization has purposes of completing the crosslinking reaction that has taken place inadequately in the primary vulcanization, and gasifying low-molecular components in the rubber to improve the strength and reduce the permanent compression set. On the other hand, the secondary vulcanization in the present invention is intended to cause the crosslinking accelerator in the primary vulcanizate to migrate to the surface and thereby to achieve low frictional properties and low tackiness and to cure the surface.

(Post-vulcanization Heat Treatment)

In the invention, the polyol-crosslinkable fluororubber composition is heat treated at a temperature in the range of 150 to 300° C., preferably 200 to 300° C., more preferably 240 to 300° C., for 0.1 to 48 hours, preferably 1 to 48 hours, more preferably 10 to 48 hours.

In view of prevention of outgassing of low-molecular volatile components from the crosslinked product, the polyol-crosslinkable fluororubber composition may be subjected to the preliminary polyol crosslinking (vulcanization) as described above according to need, and the resultant crosslinked product may be heat treated at a temperature in the range of 150 to 300° C., preferably 200 to 300° C., more preferably 240 to 300° C., for 0.1 to 48 hours, preferably 1 to 48 hours, more preferably 10 to 48 hours.

When the crosslinked product contains much low-molecular volatile (outgassing) components, the use thereof as a HDD stopper or the like can cause contamination of metal parts such as disks by the low-molecular components volatilizing from the crosslinked product. Accordingly, the heat treatment is preferably performed at high temperatures and over a long period of time.

This heat treatment of the crosslinked product causes the crosslinking accelerator or the like in the product to migrate slowly from the inside to the superficial surface, so that the superficial surface (for example, the area from the surface to a depth of about 100 μm of the crosslinked product) has a crosslinking density higher than that of the inside (for example, core) of the crosslinked product. As a result, the heat-treated crosslinked product can display a surface (crosslinked product surface) having reduced tackiness, low frictional properties and low impact resilience. The heat treatment performed under the aforementioned conditions can provide not only superior non-tackiness but also excellent stability of non-tackiness of the surface of fluororubber crosslinked product.

Specifically, the heat treatment of the crosslinked product produces a low-friction fluororubber crosslinked product having a surface static frication coefficient and dynamic friction coefficient of less than 1 each, preferably from 0.1 to 0.7 each.

When the polyol-crosslinkable fluororubber composition (uncrosslinked product) is heat treated under the conditions mentioned above, i.e., at a temperature in the range of 150 to 300° C., preferably 200 to 300° C., more preferably 240 to 300° C., for 0.1 to 48 hours, preferably 1 to 48 hours, more preferably 10 to 48 hours, the crosslinking reaction and migration of the crosslinking accelerator to the superficial surface occur simultaneously. The resultant low-friction fluororubber crosslinked product is reduced in tackiness, frictional properties and impact resilience.

The heat treatment may employ a heating apparatus such as an oven, a vulcanizing furnace or a high-frequency heater in any of the aforementioned embodiments regardless of whether the preliminary polyol crosslinking is performed or not.

The post-vulcanization heat treatment of the fluororubber composition may be similar to that for secondary oven vulcanization common in the rubber industry. The fluororubber composition used in the invention and conventional fluororubber compositions are completely different in ingredients composition and thus have different purposes and functions of the post-vulcanization heat treatment. With the conventional fluororubbers (vulcanized formed products), the post-vulcanization heat treatment is mainly intended to improve tensile properties and reduce permanent compression set.

On the other hand, the invention employs the uncrosslinked fluororubber composition (or preform thereof) having the specific composition, and the post-crosslinking heat treatment has purposes of quickly facilitating the migration of the crosslinking accelerator to the formed product surface, and stabilizing the accelerator to achieve low-frictional properties and low tackiness in the surface of formed product. The heat treatment does provide such effects.

With the conventional fluororubber compositions, primary vulcanization such as press vulcanization in a mold under traditional conditions (as primary vulcanization conditions of 140 to 200° C. and about 2 to 120 minutes as disclosed in JP-A-H07-82449 (Patent Document 4)) cannot achieve adequate migration of the crosslinking accelerator to the surface. Accordingly, the formed products obtainable do not show low frictional properties and low tackiness.

On the other hand, the uncrosslinked fluororubber composition of the invention shows migration of the crosslinking accelerator to the surface simply upon primary vulcanization in an oven at a temperature in the range of 150 to 300° C., preferably 200 to 300° C., more preferably 240 to 300° C., for 0.1 to 48 hours, preferably 1 to 48 hours, more preferably 10 to 48 hours. The resultant low-friction fluororubber crosslinked product has low frictional properties and low tackiness, and no further heat treatment under similar conditions is required.

Even when the conventional (uncrosslinked) fluororubbers are subjected to primary vulcanization under similar conditions, they cannot give low-friction and low-tackiness fluororubber crosslinked products.

In particular, the present invention can be distinguished from JP-B-H04-37094 (Patent Document 1) as follows. As described in BACKGROUND OF THE INVENTION above, JP-B-H04-37094 discloses a method in which the surface of fluorine-containing elastomer vulcanizate is impregnated with a solution (hereinafter the "treating agent") containing a crosslinking (vulcanizing) agent for fluororubber and optionally a vulcanization accelerating promoter (crosslinking accelerator) to perform re-vulcanization and thereby the crosslinking density in the superficial surface of the fluorine-containing elastomer formed product is increased and the formed product is reduced in tackiness and frictional properties.

In contrast, the present invention employs the specific polyol-crosslinkable fluororubber composition which JP-B-H04-37094 and other patent documents never even suggest. The use of the composition enables production of low-friction fluororubber formed products having a surface condition (e.g., low frictional properties) similar to that described in the patent document, simply by heat treatment of the crosslinked product without any "treating agent" of JP-B-H04-37094.

Further, in the invention, the use of the crosslinking accelerator in an increased amount leads to a low-friction fluororubber crosslinked product capable of giving a heat-treated product with lower impact resilience at high temperatures.

Specifically, the crosslinked accelerator contained in the crosslinked product makes migration to the rubber superficial surface upon heat treatment of the vulcanizate. The closer to the formed product surface the crosslinking accelerator migrates, the higher the crosslinking density in the rubber superficial surface is. Accordingly, the invention can produce a low-friction fluororubber crosslinked product having a surface condition similar to that described in JP-B-H04-37094 simply by heat treating the crosslinked rubber formed product without coating the rubber surface.

Furthermore, the invention can be distinguished from JP-A-2001-192482 (Patent Document 6) as follows. JP-A-2001-192482 discloses a process in which a fluororubber composition is vulcanized and formed in the presence of a polyol vulcanizing agent and is heat treated at a temperature of about 250 to 300° C. to give a vulcanized fluororubber formed product having superior properties such as resistance to permanent compression set, wherein the fluororubber composition comprises 100 parts by weight of a fluororubber, 0.5 to 3 parts by weight of calcium hydroxide, 4 to 15 parts by weight of magnesium oxide, and 10 to 50 parts by weight of thermal black and a bituminous coal filler combined. The fluororubber composition disclosed in the patent document has a small crosslinking accelerator/crosslinking agent ratio, and contains much magnesium oxide, i.e., 4 to 15 parts by weight per 100 parts by weight of the fluororubber. Even if a vulcanizate (crosslinked rubber formed product) of this composition is heat treated under the conditions of the present invention, the organic quaternary phosphonium salt makes insufficient migration to the rubber surface and the resultant product has high impact resilience and high tackiness to metals.

(Low-friction Fluororubber Crosslinked Product)

The invention performs "heat treatment" of the fluororubber crosslinked product from the crosslinkable fluororubber composition of specific ingredients composition, thereby to produce a low-friction fluororubber crosslinked product (fluororubber crosslinked heat-treated product) having a surface frication coefficient of less than 1, preferably from 0.1 to 0.7. This fluororubber crosslinked product possesses a low surface friction coefficient as above, and further has low tackiness, low impact resilience, low static friction coefficient, low dynamic friction coefficient, and appropriate hardness.

For example, the properties of the fluororubber crosslinked heat-treated product are as follows:

The static friction coefficient (JIS P8147) is less than 1, preferably in the range of 0.1 to 0.7, which indicates low tackiness.

The dynamic friction coefficient is less than 1, preferably in the range of 0.1 to 0.7, which indicates low tackiness. The dynamic friction coefficient is determined as follows: A 2 mm thick rubber sheet is tested in accordance with JIS K 7125 and P 8147 with use of a surface property tester (manufactured by HEIDON). The testing conditions are such that a mating part is a 10 mm diameter chrome-plated steel ball friction block, the moving rate is 50 mm/min, and the load is 50 g.

The hardness (determined with a Type A durometer in accordance with JIS K 6253) is in the range of 40 to 85 (unit: POINT), preferably 60 to 80 (unit: POINT).

The impact resilience is not more than 50%, preferably not more than 40% when determined as follows: A laminate consisting of 6 rubber sheets each 2 mm in thickness and 29 mm in diameter is tested in accordance with JIS K 6255 by the Lubke process at temperatures of 0° C., 25° C. and 70° C. This impact resilience permits the product to favorably absorb vibration of a mating part such as an arm.

The tackiness is not more than 100 g, preferably not more than 50 g when determined as follows: A metal rod (stainless steel made, weight: 16 g, configuration of curved surface contacting with the rubber: cylindrical column 3 mm in diameter and 1.5 mm in width) is pressed against a 2 mm thick rubber sheet at 60° C. over a period of 24 hours or 72 hours, and then at 0° C. for 24 hours. The tackiness of the rubber to the metal rod is measured at 0° C.

The non-tackiness durability (measurement conditions: described later) is not more than 100 g, preferably not more than 70 g. When the heat treatment is unperformed or inadequate, less crosslinking accelerator makes migration to the formed product surface and the tackiness will increase to 400 g or more.

Unleveling the surface of crosslinked product reduces the contact area between the low-friction fluororubber crosslinked product and the mating part, and a friction coefficient of less than 1 can be achieved to improve and stabilize non-tackiness properties.

(Uses of Low-friction Fluororubber Crosslinked Product

The low-friction fluororubber crosslinked product (formed product) obtained as described above is well balanced and excellent in properties such as low frictional properties, low tackiness and low resilience properties. Therefore, it is favorably employed as:

impact-absorbing stoppers such as HDD storage head stoppers, HDD stoppers, storage head stoppers in automobile (optical) disk drives and built-in camera video recorder disk drives, and printer head stoppers;

fluid (in a broad sense including gases) leak-proof rubber parts such as O-rings, packings, V-packings, oil seals, gaskets, square rings, D-rings, diaphragms and valves; and various rubber parts such as rubber vibration insulators, belts, rubber-coated fabrics and wipers.

In particular, the low-friction fluororubber crosslinked product (formed product) used as the shock-absorbing stoppers represented by HDD stoppers can be expected to remarkably reduce a malfunction caused by the tackiness of the shock-absorbing stopper to a disk arm, and to show satisfactory damping properties at high temperatures and favorably absorb the vibration of the arm.

In particular, the use of the crosslinked product obtained by the present process as HDD magnet holder type stopper can achieve a change of holding torque of not more than 14%, preferably not more than 10%. The change of holding torque in the above range enables stable prevention of malfunction of the HDD arm over a long term, and the stopper well satisfies other properties required.

As used herein, the change of holding torque is an indicator of over-time change of non-tackiness of the stopper to the arm. The smaller the value is, the longer the non-tackiness can be maintained. Namely, the stopper can prevent a malfunction of the HDD arm stably over a long term.

INDUSTRIAL APPLICABILITY

In the invention, the fluororubber crosslinked product made from the crosslinkable fluororubber composition of specific ingredients composition is heat treated. The invention thus provides the fluororubber crosslinked product having low tackiness, low frictional properties and low impact resilience, without deteriorating excellent properties inherent to the fluororubbers, such as resistance to heat, oil and chemicals.

In the invention, the crosslinkable fluororubber composition of specific ingredients composition is crosslinked according to need, and the resultant fluororubber crosslinked product is subjected to the specific "heat treatment". Alternatively, the uncrosslinked fluororubber composition of specific ingredients composition is directly subjected to the specific "heat treatment". Accordingly, the low-tackiness and low-friction fluororubber crosslinked product can be obtained stably and inexpensively in comparison with the traditional processes involving coating, chemical treatment and electron-beam treatment for the surface of fluororubber crosslinked formed product.

In particular, the fluororubber composition containing PTFE can give a low-friction fluororubber crosslinked product further improved in low tackiness, low frictional properties and low impact resilience.

In particular, the low-friction fluororubber crosslinked product may be produced such that the surface thereof is unleveled, for example in a depth of 0.5 to 200 μm, to reduce the contact area between the low-friction fluororubber crosslinked product and the mating part. Consequently, the friction coefficient can be reduced to less than 1, and the low-friction fluororubber crosslinked product can display stable low tackiness and low frictional properties.

The fluororubber crosslinked products obtained by the above-described process possess the properties aforementioned and are favorably employed as rubber vibration insulators, belts, rubber-coated fabrics, wipers, fluid leak-proof rubber parts represented by O-rings and packings, and impact-absorbing stoppers for printer head controllers and HDD (hard disk drive) head controllers, more particularly stoppers fitted in HDD to prevent a malfunction of a reading arm.

Further, the use of the rubber composition of the invention enables efficient and inexpensive production of superior non-stickiness stoppers without adversely affecting the environment.

EXAMPLES

The production process of the low-friction fluororubber crosslinked product according to the present invention will be described in more detail with reference to the following examples, but it should be construed that the invention is in no way limited to the examples.

Example 1

(Composition of Ingredients of Polyol-crosslinkable Fluororubber Composition)

Fluororubber (Viton A-500 manufactured by DuPont Dow Elastomers, Mooney viscosity $ML_{1+10}$ (121° C.): 45) . . . 100 parts by weight FEF carbon black (SEAST GSO manufactured by TOKAI CARBON CO., LTD., average particle diameter: 43 mμ, specific surface area: 42 $m^2/g$) . . . 2 parts by weight Magnesium oxide (Kyowa Mag 150 manufactured by Kyowa Chemical Industry Co., Ltd.) . . . 3 parts by weight Calcium hydroxide (CALDIC 2000 manufactured by Ohmi Chemical Industry, Ltd., specific surface area: 17 $m^2/g$) . . . 3 parts by weight Bisphenol AF (manufactured by Riedel Dehaen) . . . 2.3 parts by weight Triphenylbenzylphosphonium chloride (reagent manufactured by Kanto Kagaku) . . . 2.3 parts by weight Carnauba wax (VPA No. 2 manufactured by DuPont Dow Elastomers, melting point: 80° C.) . . . 1 part by weight The above ingredients were kneaded using a kneader and an open roll mill at 80° C. for 20 minutes, and the kneaded product was compression molded using a compression molding machine at 180° C. for 30 minutes. The product formed (compression molded product) was then heat treated in an oven at 230° C. for 24 hours.

The heat-treated product (fluororubber crosslinked and heat-treated product) was tested for properties such as static friction coefficient, dynamic friction coefficient, hardness, impact resilience, tackiness (1) and (2), and non-tackiness durability.

The results are shown in Table 1.

Example 2

A heat-treated product was obtained and tested for properties in the same manner as in Example 1, except that the composition of ingredients of polyol-crosslinkable fluororubber composition was changed as follows (namely, the composition was the same as in Example 1 except that the amount of triphenylbenzylphosphonium chloride was altered to 9.2 parts by weight).

The results are shown in Table 1.

(Composition of Ingredients of Polyol-crosslinkable Fluororubber Composition)

Fluororubber (Viton A-500 manufactured by DuPont Dow Elastomers, Mooney viscosity $ML_{1+10}$ (121° C.): 45) . . . 100 parts by weight FEF carbon black (SEAST GSO manufactured by TOKAI CARBON CO., LTD., average particle diameter: 43 mμ, specific surface area: 42 $m^2/g$) . . . 2 parts by weight Magnesium oxide (Kyowa Mag 150 manufactured by Kyowa Chemical Industry Co., Ltd.) . . . 3 parts by weight Calcium hydroxide (CALDIC 2000 manufactured by Ohmi Chemical Industry, Ltd., specific surface area: 17 $m^2/g$) . . . 3 parts by weight Bisphenol AF (manufactured by Riedel Dehaen) . . . 2.3 parts by weight Triphenylbenzylphosphonium chloride (reagent manufactured by Kanto Kagaku) . . . 9.2 parts by weight Carnauba wax (VPA No. 2 manufactured by DuPont Dow Elastomers, melting point: 80° C.) 1 part by weight

Example 3

A heat-treated product was obtained and tested for properties in the same manner as in Example 1, except that PTFE was added in an amount of 40 parts by weight (phr).

The results are shown in Table 1.

Example 4

A heat-treated product was obtained and tested for properties in the same manner as in Example 1, except that a mold having a surface unleveled with an average depth of 20 μm was used in the crosslinking molding.

The results are shown in Table 1.

Example 5

A heat-treated product was obtained and tested for properties in the same manner as in Example 1, except that the heat treatment was performed after glass beads (diameter: 100 μm) were shot to a surface of the compression molded product to roughen the surface.

The results are shown in Table 1.

Example 6

A heat-treated product was obtained and tested for properties in the same manner as in Example 1, except that the compression molded product was heat treated at 260° C. for 10 hours.

The results are shown in Table 1.

Example 7

(Composition of Ingredients of Polyol-crosslinkable Fluororubber Composition)

Fluororubber (Viton A-500 manufactured by DuPont Dow Elastomers, Mooney viscosity $ML_{1+10}$ (121° C.): 45) . . . 100 parts by weight FEF carbon black (SEAST GSO manufactured by TOKAI CARBON CO., LTD., average particle diameter: 43 mμ, specific surface area: 42 $m^2/g$) . . . 2 parts by weight Magnesium oxide (Kyowa Mag 150 manufactured by Kyowa Chemical Industry Co., Ltd.) . . . 6 parts by weight Bisphenol AF (manufactured by Riedel Dehaen) . . . 10 parts by weight Triphenylbenzylphosphonium chloride (reagent manufactured by Kanto Kagaku) . . . 10 parts by weight Carnauba wax (VPA No. 2 manufactured by DuPont Dow Elastomers, melting point: 80° C.) . . . 1 part by weight The above ingredients were kneaded using a kneader and an open roll mill at 80° C. for 20 minutes, and the kneaded product was compression molded using a compression molding machine at 180° C. for 30 minutes. The product formed (compression molded product) was then heat treated in an oven at 230° C. for 24 hours. The heat-treated product was tested for properties in the same manner as in Example 1.

The results are shown in Table 1.

Example 8

A heat-treated product was obtained and tested for properties in the same manner as in Example 1, except that the amount of calcium hydroxide was altered to 8 parts by weight (phr).

The results are shown in Table 1.

Example 9

A heat-treated product was obtained and tested for properties in the same manner as in Example 1, except that the amount of triphenylbenzylphosphonium chloride was altered to 6.9 parts by weight (phr).

The results are shown in Table 1.

Example 10

A heat-treated product was obtained and tested for properties in the same manner as in Example 1, except that the composition of ingredients of polyol-crosslinkable fluororubber composition was changed as follows (namely, the composition was the same as in Example 1 except that the amount of triphenylbenzylphosphonium chloride was altered to 2.76 parts by weight).

The results are shown in Table 1.

(Composition of Ingredients of Polyol-crosslinkable Fluororubber Composition)

Fluororubber (Viton A-500 manufactured by DuPont Dow Elastomers, Mooney viscosity $ML_{1+10}$ (121° C.): 45) . . . 100 parts by weight FEF carbon black (SEAST GSO manufactured by TOKAI CARBON CO., LTD., average particle diameter: 43 mμ, specific surface area: 42 $m^2/g$) . . . 2 parts by weight Magnesium oxide (Kyowa Mag 150 manufactured by Kyowa Chemical Industry Co., Ltd.) . . . 3 parts by weight Calcium hydroxide (CALDIC 2000 manufactured by Ohmi Chemical Industry, Ltd., specific surface area: 17 $m^2/g$) . . . 3 parts by weight Bisphenol AF (manufactured by Riedel Dehaen) . . . 2.3 parts by weight Triphenylbenzylphosphonium chloride (reagent manufactured by Kanto Kagaku) . . . 2.76 parts by weight Carnauba wax (VPA No. 2 manufactured by DuPont Dow Elastomers, melting point: 80° C.) . . . 1 part by weight Comparative Example 1

A heat-treated product was obtained and tested for properties in the same manner as in Example 1, except that the amounts of triphenylbenzylphosphonium chloride and calcium hydroxide were altered to 1.3 parts by weight (phr) and 6 parts by weight (phr), respectively.

The results are shown in Table 1.

Comparative Example 2

A crosslinked formed product was obtained and tested for properties in the same manner as in Example 1, except that the crosslinked formed product (compression molded product) was not heat treated.

The results are shown in Table 1.

Comparative Example 3

A heat-treated product was obtained and tested for properties in the same manner as in Comparative Example 1, except that before the heat treatment, the product formed (compression molded product) was soaked in a treatment solution containing the following crosslinking agent and crosslinking accelerator (solvent: acetone) at a soaking temperature of 20° C. and for a soaking time of 1 hour, and the product was recovered from the solution, followed by removing the solvent by drying, and was heat treated at 230° C. for 24 hours.

The results are shown in Table 1.

(Treatment Solution)

Bisphenol AF (manufactured by Riedel Dehaen) . . . 10 parts by weight

Triphenylbenzylphosphonium chloride (reagent manufactured by Kanto Kagaku) . . . 2 parts by weight Acetone (reagent manufactured by Kanto Kagaku) . . . 88 parts by weight Comparative Example 4

A heat-treated product was obtained and tested for properties in the same manner as in Example 1, except that the calcium hydroxide was used in an amount of 2 parts by weight (phr), the magnesium oxide in an amount of 8 parts by weight (phr), the bisphenol AF in an amount of 1.5 parts by weight (phr), and the triphenylbenzylphosphonium chloride in an amount of 0.5 part by weight (phr).

The results are shown in Table 1.

Comparative Example 5

(Composition of Ingredients of Polyol-crosslinkable Fluororubber Composition)

Viton GLT (manufactured by DuPont Dow Elastomers, Mooney viscosity $ML_{1+10}$ (121° C.): 90) . . . 100 parts by weight MT carbon (Huber N-990 manufactured by Huber, average particle diameter: 500 mμ, specific surface area: 6 $m^2/g$) . . . 10 parts by weight Calcium hydroxide (CALDIC 2000 manufactured by Ohmi Chemical Industry, Ltd., specific surface area: 17 $m^2/g$) . . . 4 parts by weight Triallyl isocyanurate (TAIC manufactured by Nihon Kasei CO., LTD.) . . . 2.4 parts by weight Organic peroxide crosslinking agent (PERHEXA 25B manufactured by NOF CORPORATION) . . . 0.8 part by weight A fluororubber composition containing the above ingredients was kneaded using a kneader and an open roll mill at 80° C. for 20 minutes, and the kneaded product was compression molded using a compression molding machine at 170° C. for 30 minutes. The product formed was then heat treated in an oven at 230° C. for 24 hours.

The heat-treated product was tested for properties in the same manner as in Example 1.

The results are shown in Table 1.

Comparative Example 6

A heat-treated product was obtained and tested for properties in the same manner as in Example 1, except that calcium hydroxide was altered to one having a specific surface area of 48 $m^2/g$.

The calcium hydroxide was prepared by a method similar to that disclosed in Example 1 of paragraph [0016] of JP-A-H09-100119.

The results are shown in Table 1.

Comparative Example 7

A heat-treated product was obtained and tested for properties in the same manner as in Example 1, except that the amounts of triphenylbenzylphosphonium chloride and calcium hydroxide were altered to 13.8 parts by weight (phr) and 6 parts by weight (phr), respectively.

The results are shown in Table 1.

(Conditions of Property Measurements)

The conditions of property measurements in Examples 1 to 10 and Comparative Examples 1 to 7 are as follows:

(1) Measurement of Static Friction Coefficient

A rubber sheet specimen was placed on a sloping plate, and the angle of slope was gradually increased in accordance with JIS P8147. The tangent (tan θ) of angle at which the rubber sheet started sliding was determined as the static friction coefficient. The higher the static friction coefficient is, the higher the rubber tackiness tends to be.

(2) Measurement of Dynamic Friction Coefficient

A rubber sheet specimen 2 mm thick was tested in accordance with JIS K 7125 and P 8147 with use of a surface property tester (manufactured by HEIDON) to determine the dynamic friction coefficient of sheet surface. The higher the dynamic friction coefficient is, the higher the rubber tackiness tends to be.

(Testing Conditions)

Mating part: a 10 mm diameter chrome-plated steel ball friction block

Moving rate: 50 mm/min

Load: 50 g (3) Measurement of Hardness

A rubber sheet specimen was tested for hardness with a Type A durometer in accordance with JIS K 6253.

(4) Measurement of Impact Resilience

A laminate consisting of 6 rubber sheet specimens each 2 mm in thickness and 29 mm in diameter was tested in accordance with JIS K 6255 by the Lubke process at temperatures of 0° C., 25° C. and 70° C. to determine the impact resilience at each temperature. The lower the impact resilience, the higher the absorption of arm vibration.

(5) Measurement of Tackiness

[Measurement of Tackiness (1)]

A metal rod (stainless steel made, weight: 16 g, configuration of curved surface contacting with the rubber: cylindrical column 3 mm in diameter and 1.5 mm in width) was pressed against a 2 mm thick rubber sheet specimen at 60° C. over a period of 24 hours, and then at 0° C. for 24 hours. The tackiness of the rubber to the metal rod was measured at 0° C.

[Measurement of Tackiness (2)]

A metal rod (stainless steel made, weight: 16 g, configuration of curved surface contacting with the rubber: cylindrical column 3 mm in diameter and 1.5 mm in width) was pressed against a 2 mm thick rubber sheet specimen at 60° C. over a period of 72 hours, and then at 0° C. for 24 hours. The tackiness of the rubber to the metal rod was measured at 0° C.

(6) Evaluation of Non-tackiness Durability

A hard disk drive as illustrated in FIG. 1 was prepared, which included a 3 inch-diameter disk having an aluminum substrate and a sputtered thin film, a nanoslider of AlTiC thin film head arm, and a voice coil motor (VCM) fitted with two opposite polarity magnets.

Figure 2:
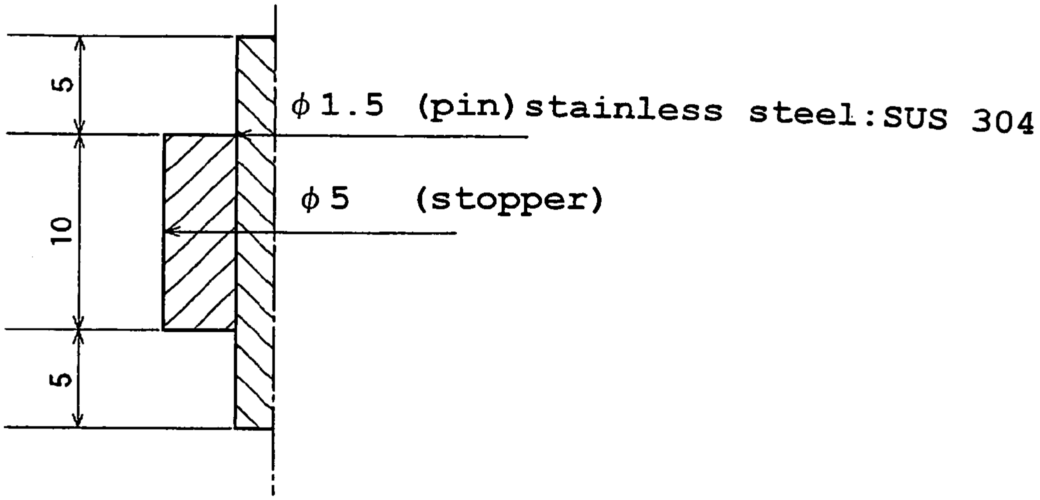
FIG. 2 is a sectional view of an outer stopper fitted in the testing device of FIG. 1.

A cylindrical outer stopper rubber having been water washed and ultrasonic cleaned (outer diameter: 5 mm, length in axial direction: 10 mm) was inserted around a stainless steel pin of this HDD such that the center in axial direction of the rubber was approximately aligned with the center in longitudinal direction of the stainless steel pin (diameter: 1.5 mm, length, 20 mm, material: SUS 304), as shown in FIG. 2.

Next, the arm was hit against the stopper rubber 50,000 times at room temperature, and the stopper rubber and the arm were held in contact with each other at 60° C. over a period of 24 hours, and then at 0° C. for 24 hours. Thereafter, the tackiness was measured at 0° C.

(7) Flexing Test

The flexing resistance was tested in accordance with JIS K 5600-5-1 (cylindrical mandrel test). A flex testing machine Type 1 (mandrel diameter: 2 mm) was used to fold 180° a 2 mm-thick rubber sheet at room temperature. The flexing resistance was evaluated as A when no cracks were found by visual and 25× light microscope observation, B when cracks were found by 25× light microscope observation (but no functional problems), and C when cracks were found by visual and 25× light microscope observation.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Composition (parts by weight) | | | | | | | | | | |
| Fluororubber (Viton A-500)[(a)] | 100 | 100 | 100 | 100 | 100 | 100 | 100 | 100 | 100 | 100 |
| Fluororubber (Viton GLT)[(b)] | — | — | — | — | — | — | — | — | — | — |
| FEF carbon black[(c)] | 2 | 2 | 2 | 2 | 2 | 2 | 2 | 2 | 2 | 2 |
| MT carbon[(d)] | — | — | — | — | — | — | — | — | — | — |
| Magnesium oxide | 3 | 3 | 3 | 3 | 3 | 3 | 6 | 3 | 3 | 3 |
| Calcium hydroxide (17 $m^2$/g)/(48 $m^2$/g) | 3/— | 3/— | 3/— | 3/— | 3/— | 3/— | —/— | 8/— | 3/— | 3/— |
| Bisphenol AF (crosslinking agent)[(e)] | 2.3 | 2.3 | 2.3 | 2.3 | 2.3 | 2.3 | 10 | 2.3 | 2.3 | 2.3 |
| Perhexa 25B (crosslinking agent)[(f)] | — | — | — | — | — | — | — | — | — | — |
| Triphenylbenzylphosphonium chloride (crosslinking accelerator) | 2.3 | 9.2 | 2.3 | 2.3 | 2.3 | 2.3 | 10 | 2.3 | 6.9 | 2.76 |
| Triallyl isocyanurate (crosslinking accelerator)[(g)] | — | — | — | — | — | — | — | — | — | — |
| Carnauba wax[(h)] | 1 | 1 | 1 | 1 | 1 | 1 | 1 | 1 | 1 | 1 |
| PTFE | — | — | 40 | — | — | — | — | — | — | — |
| crosslinking accelerator/crosslinking agent (weight ratio) | 1.0 | 4.0 | 1.0 | 1.0 | 1.0 | 1.0 | 1.0 | 1.0 | 3.0 | 1.2 |
| Kneading (kneader and open roll mill 80° C./20 min) | Perfd. | Perfd. | Perfd. | Perfd. | Perfd. | Perfd. | Perfd. | Perfd. | Perfd. | Perfd. |
| Compression molding (° C./min) | 180/30 | 180/30 | 180/30 | 180/30 | 180/30 | 180/30 | 180/30 | 180/30 | 180/30 | 180/30 |
| Soak in treatment solution (20° C./1 hr)[(i)] | — | — | — | — | — | — | — | — | — | — |
| Oven heat treatment (° C./hr) | 230/24 | 230/24 | 230/24 | 230/24 | 230/24 | 260/10 | 230/24 | 230/24 | 230/24 | 230/24 |
| Glass beads pretreatment/20 μm unlevel mold | —/— | —/— | —/— | Mold used | Beads pretrtm | —/— | —/— | —/— | —/— | —/— |
| Properties of crosslinked product | | | | | | | | | | |
| Static friction coefficient (JIS P 8147) | 0.4 | 0.3 | 0.3 | 0.2 | 0.2 | 0.3 | 0.2 | 0.7 | 0.2 | 0.3 |
| Dynamic friction coefficient (JIS K7125 P8147) | 0.7 | 0.4 | 0.6 | 0.5 | 0.4 | 0.6 | 0.6 | 0.9 | 0.3 | 0.5 |

TABLE 1-continued

| | | | | | | | | | | |
|---|---|---|---|---|---|---|---|---|---|---|
| Hardness (JIS K6253) | | 62 | 65 | 75 | 62 | 62 | 65 | 80 | 65 | 64 | 63 |
| Impact resilience | 0° C. | 5 | 5 | 5 | 5 | 5 | 5 | 5 | 5 | 5 | 5 |
| (%) | 25° C. | 10 | 10 | 8 | 10 | 10 | 10 | 11 | 11 | 10 | 10 |
| (JIS K 6255) | 70° C. | 39 | 35 | 30 | 39 | 39 | 41 | 35 | 43 | 37 | 37 |
| Tackiness (1) (g) | | 6 | 6 | 4 | 3 | 0 | 6 | 6 | 15 | 6 | 6 |
| Tackiness (2) (g) | | 45 | 10 | 30 | 35 | 25 | 20 | 35 | 70 | 15 | 20 |
| Tackiness after durability test (g) | | 8 | 6 | 5 | 4 | 2 | 6 | 6 | 20 | 6 | 7 |
| Flexing resistance (JIS K 5600) | | A | B | A | A | A | A | B | A | A | A |

| | Comparative Example | | | | | | |
|---|---|---|---|---|---|---|---|
| | 1 | 2 | 3 | 4 | 5 | 6 | 7 |
| Composition (parts by weight) | | | | | | | |
| Fluororubber (Viton A-500)(a) | 100 | 100 | 100 | 100 | — | 100 | 100 |
| Fluororubber (Viton GLT)(b) | — | — | — | — | 100 | — | — |
| FEF carbon black(c) | 2 | 2 | 2 | 2 | — | 2 | 2 |
| MT carbon(d) | — | — | — | — | 10 | 10 | — |
| Magnesium oxide | 3 | 3 | 3 | 8 | — | — | 3 |
| Calcium hydroxide (17 $m^2$/g)/(48 $m^2$/g) | 6/— | 3/— | 6/— | 2/— | 4/— | —/3 | 6/— |
| Bisphenol AF (crosslinking agent)(e) | 2.3 | 2.3 | 2.3 | 1.5 | — | 2.3 | 2.3 |
| Perhexa 25B (crosslinking agent)(f) | — | — | — | — | 0.8 | — | — |
| Triphenylbenzylphosphonium chloride (crosslinking accelerator) | 1.3 | 2.3 | 1.3 | 0.5 | — | 2.3 | 13.8 |
| Triallyl isocyanurate (crosslinking accelerator)(g) | — | — | — | — | 2.4 | — | — |
| Carnauba wax(h) | 1 | 1 | 1 | 1 | — | 1 | 1 |
| PTFE | — | — | — | — | — | — | — |
| crosslinking accelerator/crosslinking agent (weight ratio) | 0.6 | 1.0 | 0.6 | 0.3 | 3.0 | 1.0 | 6.0 |
| Kneading (kneader and open roll mill 80° C./20 min) | Perfd. | Perfd. | Perfd. | Perfd. | Perfd. | Perfd. | Perfd. |
| Compression molding (° C./min) | 180/30 | 180/30 | 180/30 | 180/30 | 170/30 | 180/30 | 180/30 |
| Soak in treatment solution (20° C./1 hr)(i) | — | — | Perfd. | — | — | — | — |
| Oven heat treatment (° C./hr) | 230/24 | — | 230/24 | 230/24 | 230/24 | 230/24 | 230/24 |
| Glass beads pretreatment/20 μm unlevel mold | —/— | —/— | —/— | —/— | —/— | —/— | —/— |
| Properties of crosslinked product | | | | | | | |
| Static friction coefficient (JIS P 8147) | 2.7 | 2.7 | 0.5 | 2.0 | 1.7 | 1.2 | 0.3 |
| Dynamic friction coefficient (JIS K7125 P8147) | 2.6 | 2 | 0.8 | 2.2 | 2.5 | 1.2 | 0.3 |
| Hardness (JIS K6253) | 60 | 57 | 67 | 63 | 63 | 65 | 75 |
| Impact resilience 0° C. | 5 | 10 | 5 | 5 | 6 | 5 | 8 |
| (%) 25° C. | 12 | 15 | 10 | 15 | 43 | 10 | 10 |
| (JIS K 6255) 70° C. | 63 | 60 | 55 | 67 | 72 | 55 | 32 |
| Tackiness (1) (g) | 590 | 580 | 21 | 500 | 570 | 150 | 4 |
| Tackiness (2) (g) | 790 | 780 | 40 | 700 | 770 | 350 | 8 |
| Tackiness after durability test (g) | 500 | 490 | 26 | 550 | 480 | 180 | 6 |
| Flexing resistance (JIS K 5600) | A | A | A | A | A | A | C |

<Note>
(a)manufactured by DuPont Dow Elastomers, polyol vulcanizable,
(b)manufactured by DuPont Dow Elastomers, peroxide crosslinkable,
(c)manufactured by Tokai Carbon, reinforcing agent, average particle diameter: 43 mμ, specific surface area: 42 $m^2$/g,
(d)manufactured by Huber, reinforcing agent Huber N-990, average particle diameter: 500 mμ, specific surface area: 6 $m^2$/g,
(e)manufactured by Riedel Dehaen, polyol crosslinking agent,
(f)manufactured by NOF Corporation, organic peroxide crosslinking agent,
(g)manufactured by Nippon Kasei Chemial Co., Ltd., trade name: TAIC,
(h)manufactured by DuPont Dow Elastomers, VPA No. 2, mp: 80° C.,
(i)treatment solution (bisphenol AF 10 parts by weight + triphenylbenzylphosphonium chloride 2 parts by weight + acetone 88 parts by weight)

Example 11

(Composition of Ingredients of Polyol-crosslinkable Fluororubber Composition)

Fluororubber (Viton A-500 manufactured by DuPont Dow Elastomers, Mooney viscosity $ML_{1+10}$ (121° C.): 45) . . . 100 parts by weight MT carbon (Huber N-990 manufactured by Huber, average particle diameter: 500 mμ, specific surface area: 6 $m^2/g$) . . . 20 parts by weight Magnesium oxide (Kyowa Mag 150 manufactured by Kyowa Chemical Industry Co., Ltd.) . . . 3 parts by weight Calcium hydroxide (CALDIC 2000 manufactured by Ohmi Chemical Industry, Ltd., specific surface area: 17 $m^2/g$) . . . 3 parts by weight CURATIVE VC 30 (manufactured by DuPont Dow Elastomers, containing 50 wt % of crosslinking agent (bisphenol AF) and 50 wt % of fluororubber (Viton E-45) . . . 4.5 parts by weight CURATIVE VC 20 (manufactured by DuPont Dow Elastomers, containing 33 wt % of crosslinking accelerator (organic phosphonium salt) and 67 wt % of fluororubber (Viton E-45)) . . . 7.0 parts by weight The above ingredients were kneaded using a kneader and an open roll mill at 80° C. for 20 minutes, and the kneaded product was compression molded using a compression molding machine at 170° C. for 20 minutes into a rubber sheet and a product (magnet holder-type stopper). The products formed (compression molded products) were then heat treated in an oven at 240° C. for 10 hours. The heat-treated products (fluororubber crosslinked and heat-treated products) were tested for properties such as hardness, change of tackiness in a magnet test and change of holding torque.

The results are shown in Table 2. The combination of dihydroxy aromatic compound and organic phosphonium salt in specific amounts is shown to provide a non-tackiness effect. Examples resulted in smaller changes of holding torque as compared with those of conventional rubber crosslinked products.

Example 12

A heat-treated product was obtained and tested for properties in the same manner as in Example 11, except that the composition of ingredients of polyol-crosslinkable fluororubber composition was changed as follows (namely, the composition was the same as in Example 11 except that the amount of CURATIVE VC 20 was altered to 7.5 parts by weight).

The results are shown in Table 2.

(Composition of Ingredients of Polyol-crosslinkable Fluororubber Composition)

Fluororubber (Viton A-500 manufactured by DuPont Dow Elastomers, Mooney viscosity $ML_{1+10}$ (121° C.): 45) . . . 100 parts by weight MT carbon (Huber N-990 manufactured by Huber, average particle diameter: 500 mμ, specific surface area: 6 $m^2/g$) . . . 20 parts by weight Magnesium oxide (Kyowa Mag 150 manufactured by Kyowa Chemical Industry Co., Ltd.) . . . 3 parts by weight Calcium hydroxide (CALDIC 2000 manufactured by Ohmi Chemical Industry, Ltd., specific surface area: 17 $m^2/g$) . . . 3 parts by weight CURATIVE VC 30 (manufactured by DuPont Dow Elastomers, containing 50 wt % of crosslinking agent (bisphenol AF) and 50 wt % of fluororubber (Viton E-45) . . . 4.5 parts by weight CURATIVE VC 20 (manufactured by DuPont Dow Elastomers, containing 33 wt % of crosslinking accelerator (organic phosphonium salt) and 67 wt % of fluororubber (Viton E-45)) . . . 8.0 parts by weight Example 13

A heat-treated product was obtained and tested for properties in the same manner as in Example 11, except that the amount of CURATIVE VC 20 was altered to 9.0 parts by weight.

The results are shown in Table 2.

Example 14

A heat-treated product was obtained and tested for properties in the same manner as in Example 11, except that the amount of CURATIVE VC 20 was altered to 6.0 parts by weight.

The results are shown in Table 2.

Example 15

A heat-treated product was obtained and tested for properties in the same manner as in Example 11, except that the amount of CURATIVE VC 20 was altered to 10.5 parts by weight.

The results are shown in Table 2.

Comparative Example 8

A heat-treated product was obtained and tested for properties in the same manner as in Example 11, except that the amount of CURATIVE VC 20 was altered to 1.5 parts by weight.

The results are shown in Table 2. The composition of ingredients in this example is similar to those of general-purpose fluororubbers. This example resulted in great change of holding torque.

Comparative Example 9

Fluororubber (Viton A-500 manufactured by DuPont Dow Elastomers, Mooney viscosity $ML_{1+10}$ (121° C.): 45) . . . 100 parts by weight MT carbon (Huber N-990 manufactured by Huber, average particle diameter: 500 mμ, specific surface area: 6 $m^2/g$) . . . 20 parts by weight Magnesium oxide (Kyowa Mag 150 manufactured by Kyowa Chemical Industry Co., Ltd.) . . . 3 parts by weight Calcium hydroxide (CALDIC 2000 manufactured by Ohmi Chemical Industry, Ltd., specific surface area: 17 $m^2/g$) . . . 3 parts by weight Wet silica (NIPSEAL ER manufactured by NIPPON SILICA GLASS Co.,Ltd., average particle diameter: 11 μm) . . . 1 part by weight CURATIVE VC 30 (manufactured by DuPont Dow Elastomers, containing 50 wt % of crosslinking agent (bisphenol AF) and 50 wt % of fluororubber (Viton E-45)) . . . 4.5 parts by weight CURATIVE VC 20 (manufactured by DuPont Dow Elastomers, containing 33 wt % of crosslinking accelerator (organic phosphonium salt) and 67 wt % of fluororubber (Viton E-45)) . . . 1.5 parts by weight A heat-treated product was obtained and tested for properties in the same manner as in Example 11.

The results are shown in Table 2. The use of silica is shown to result in great change of holding torque.

Comparative Example 10

A heat-treated product was obtained and tested for properties in the same manner as in Example 11, except that the amount of CURATIVE VC 20 was altered to 3.0 parts by weight.

The results are shown in Table 2. The composition of ingredients in this example is similar to those of general-purpose fluororubbers. This example resulted in great change of holding torque.

Comparative Example 11

A heat-treated product was obtained and tested for properties in the same manner as in Example 11, except that the amount of CURATIVE VC 20 was altered to 4.5 parts by weight.

The results are shown in Table 2. The composition of ingredients in this example is similar to those of general-purpose fluororubbers. This example resulted in great change of holding torque.

Reference Example 1

Fluororubber (Viton A-500 manufactured by DuPont Dow Elastomers, Mooney viscosity $ML_{1+10}$ (121° C.): 45) . . . 100 parts by weight MT carbon (Huber N-990 manufactured by Huber, average particle diameter: 500 mg, specific surface area: 6 $m^2/g$) . . . 20 parts by weight Magnesium oxide (Kyowa Mag 150 manufactured by Kyowa Chemical Industry Co., Ltd.) . . . 3 parts by weight Calcium hydroxide (CALDIC 2000 manufactured by Ohmi Chemical Industry, Ltd., specific surface area: 17 $m^2/g$) . . . 3 parts by weight Wet silica (NIPSEAL ER manufactured by NIPPON SILICA GLASS Co.,Ltd., average particle diameter: 11 μm) . . . 1 part by weight CURATIVE VC 30 (manufactured by DuPont Dow Elastomers, containing 50 wt % of crosslinking agent (bisphenol AF) and 50 wt % of fluororubber (Viton E-45)) . . . 1.5 parts by weight CURATIVE VC 20 (manufactured by DuPont Dow Elastomers, containing 33 wt % of crosslinking accelerator (organic phosphoniumsalt) and 67 wt % of fluororubber (VitonE-45)) . . . 4 parts by weight A heat-treated product was obtained and tested for properties in the same manner as in Example 11.

The results are shown in Table 2. The use of silica is shown to result in great change of holding torque.

(Conditions of Property Measurements)

The conditions of property measurements in Examples 11 to 15 and Comparative Examples 8 to 11 are as follows:

(1) Measurement of Hardness

A rubber sheet specimen was tested for hardness with a Type A durometer in accordance with JIS K 6253.

(2) Test of Magnet Tackiness Change

Figure 3:
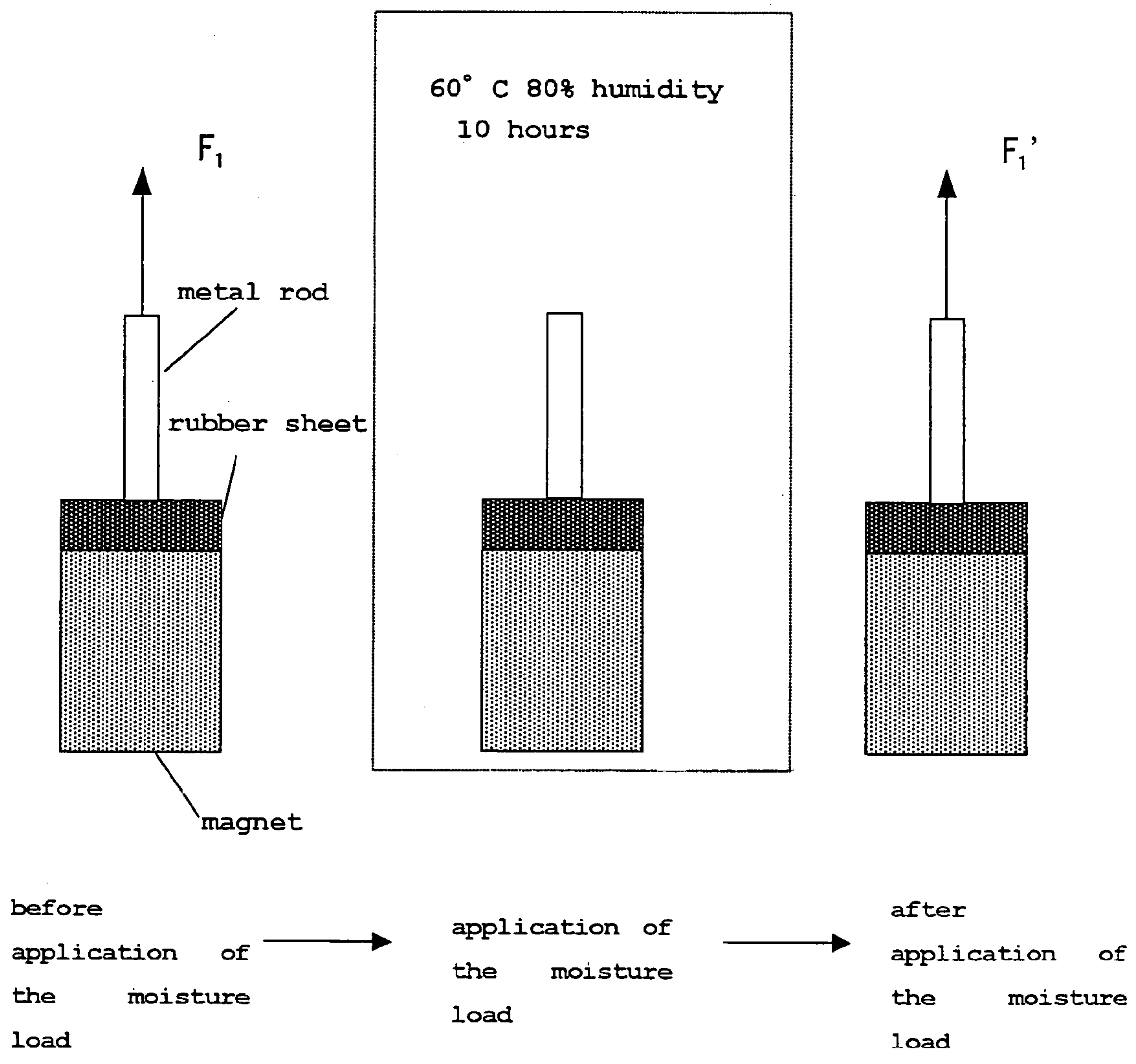
FIG. 3 is an explanatory view of a testing device used for evaluating the change of tackiness in a magnet test.

A rubber sheet specimen 0.4 mm thick by 3 mm long by 3 mm wide was placed on a magnet whose bottom was fixed as shown in FIG. 3 (permanent magnet, rectangular column 3.6 mm thick by 3 mm long by 3 mm wide). A metal rod (SPCC (cold rolled steel plate), weight: 30 g, configuration of part contacting with the rubber: 3 mm×1 mm rectangular column) was put on the rubber sheet specimen. The initial tackiness $F_1$ between the rubber and the metal rod was measured at 23° C. and 50% humidity.

Subsequently, the metal rod was put again on the rubber specimen, and the test unit consisting of the magnet, rubber specimen and metal rod was allowed to stand at 60° C. and 80% humidity for 10 hours.

The unit was then brought back to 23° C. and 50% humidity, and the tackiness $F_1'$ after application of the moisture load was measured. The tackiness increase was obtained from the results $F_1$ and $F_1'$ using the following equation:

$$(\text{Tackiness increase})=(F_1'-F_1)/F_1\times 100$$

(3) Change of Holding Torque

Figure 4:
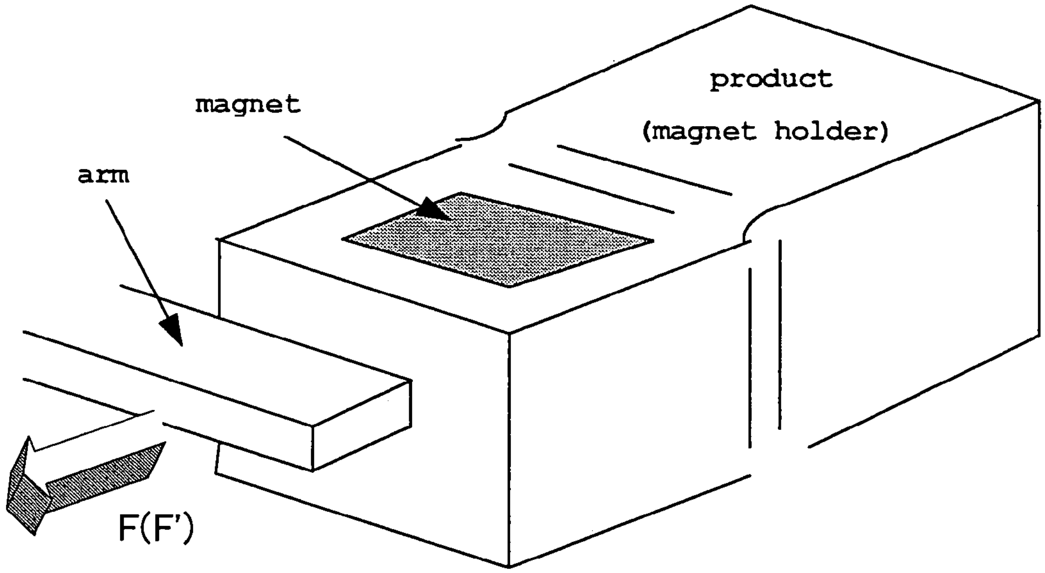
FIG. 4 is an explanatory view of a testing device used for evaluating the holding torque.

A crosslinked product was prepared in the shape of magnet holder-type stopper as illustrated in FIG. 4, and a magnet was fitted therein. The resultant unit was installed in a hard disk drive, and a HDD arm was brought into contact with the stopper. The arm was then separated from the stopper at 23° C. and 50% humidity, and the load required for separation was determined as the initial holding torque $F_2$.

Subsequently, the arm was brought into contact with the stopper again, and they were held in contact with each other at 60° C. and 80% humidity for 10 hours.

The stopper and the arm were then brought back to 23° C. and 50% humidity, and the holding torque $F_2'$ after application of the moisture load was measured. The change of holding torque was obtained from the results $F_2$ and $F_2'$ using the following equation:

$$(\text{Change of holding torque})=(F_2'-F_2)/F_2\times 100$$

TABLE 2

| | Example | | | | | Comparative Example | | | | Reference Example |
|---|---|---|---|---|---|---|---|---|---|---|
| | 11 | 12 | 13 | 14 | 15 | 8 | 9 | 10 | 11 | 1 |
| Composition of ingredients of fluororubber composition (parts by weight) | | | | | | | | | | |
| Fluororubber (Viton A-500)(1) | 100 | 100 | 100 | 100 | 100 | 100 | 100 | 100 | 100 | 100 |
| MT carbon(2) | 20 | 20 | 20 | 20 | 20 | 20 | 20 | 20 | 20 | 20 |
| Magnesium oxide | 3 | 3 | 3 | 3 | 3 | 3 | 3 | 3 | 3 | 3 |

TABLE 2-continued

| | Example | | | | | Comparative Example | | | | Reference Example |
|---|---|---|---|---|---|---|---|---|---|---|
| | 11 | 12 | 13 | 14 | 15 | 8 | 9 | 10 | 11 | 1 |
| Calcium hydroxide (17 $m^2/g$) | 3 | 3 | 3 | 3 | 3 | 3 | 3 | 3 | 3 | 3 |
| NIPSEAL ER | — | — | — | — | — | — | 1 | — | — | 1 |
| CURATIVE VC 30[(3)] (crosslinking agent-containing master batch) | 4.5 | 4.5 | 4.5 | 4.5 | 4.5 | 4.5 | 4.5 | 4.5 | 4.5 | 1.5 |
| CURATIVE VC 20[(4)] (crosslinking accelerator-containing master batch) | 7.0 | 8.0 | 9.0 | 6.0 | 10.5 | 1.5 | 1.5 | 3.0 | 4.5 | 4.0 |
| Crosslinking accelerator/crosslinking agent (weight ratio) | 1.0 | 1.2 | 1.3 | 0.9 | 1.5 | 0.2 | 0.2 | 0.4 | 0.7 | 1.8 |
| Kneading (kneader 80° C./20 min) | Perfd. | Perfd. | Perfd. | Perfd. | Perfd. | Perfd. | Perfd. | Perfd. | Perfd. | Perfd. |
| Compression molding (° C./min) | | | 170/20 | | | | | 170/20 | | |
| Oven heat treatment (° C./hr) | | | 240/10 | | | | | 240/10 | | |
| Properties of crosslinked product | | | | | | | | | | |
| Hardness (JIS K 6253) | 78 | 78 | 78 | 78 | 78 | 77 | 78 | 77 | 77 | 75 |
| Magnetic tackiness change (%) | 13 | 8 | 5 | 5 | 9 | 53 | 70 | 55 | 45 | 60 |
| Holding torque change (%) | 13 | 7 | 5 | 6 | 8 | 60 | 80 | 58 | 48 | 70 |

(1)Manufactured by DuPont Dow Elastomers, polyol crosslinkable,
(2)Manufactured by Huber, Huber N-990, average particle diameter: 500 mμ, specific surface area 6 $m^2/g$, reinforcing agent,
(3)Manufactured by DuPont Dow Elastomers, containing 50 wt % of crosslinking agent (bisphenol AF) and 50 wt % of fluororubber (Viton E-45)
(4)Manufactured by DuPont Dow Elastomers, containing 33 wt % of crosslinking accelerator (organic phosphonium salt) and 67 wt % of fluororubber (Viton E-45)

The invention claimed is:

1. A process for producing a low-friction fluororubber crosslinked product, comprising:

preliminarily polyol crosslinking a polyol-crosslinkable fluororubber composition according to need, the composition comprising a polyol-crosslinkable fluororubber in combination with a crosslinking accelerator, a polyol crosslinking agent, calcium hydroxide and optionally magnesium oxide, wherein the crosslinking accelerator has a weight ratio (R) to the polyol crosslinking agent (crosslinking accelerator/polyol crosslinking agent) in the range of 0.9 to 5; and heat treating the fluororubber composition at a temperature in the range of 150 to 300° C. for 0.1 to 48 hours to produce a low-friction fluororubber crosslinked product having a surface frication coefficient of less than 1.

2. The process according to claim 1, wherein the weight ratio R is in the range of 0.9 to 3 and the heat treatment is performed at a temperature in the range of 200 to 300° C.

3. The process according to claim 1, wherein the weight ratio R is in the range of 0.9 to 2 and the heat treatment is performed at a temperature in the range of 240 to 300° C. for 10 to 48 hours.

4. The process according to claim 1, wherein the crosslinking accelerator is an organic quaternary phosphonium salt and the polyol crosslinking agent is a bisphenol.

5. The process according to claim 1, wherein the fluororubber composition contains the crosslinking accelerator and the polyol crosslinking agent in amounts of 2.1 to 20 parts by weight and 0.4 to 20 parts by weight, respectively, per 100 parts by weight of the polyol-crosslinkable fluororubber.

6. The process according to claim 1, wherein the fluororubber composition contains calcium hydroxide having a specific surface area of less than 20 $m^2/g$ in an amount of 0.5 to 10 parts by weight per 100 parts by weight of the polyol-crosslinkable fluororubber.

7. The process according to claim 1, wherein the fluororubber composition contains the magnesium oxide in an amount of not more than 3.0 parts by weight per 100 parts by weight of the polyol-crosslinkable fluororubber.

8. The process according to claim 1, wherein the polyol-crosslinkable fluororubber composition contains polytetrafluoroethylene (PTFE) in an amount of 5 to 200 parts by weight per 100 parts by weight of the polyol-crosslinkable fluororubber.

9. The process according to claim 1, wherein the polyol-crosslinkable fluororubber composition is polyol-crosslinked using a compression mold whose inner peripheral surface is unleveled to give a crosslinked product having an uneven surface with an average depth of 0.5 to 200 mm, and the crosslinked product is subjected to the heat treatment.

10. A fluororubber composition capable of giving a crosslinked product by heat treatment that is used as a stopper in hard disk drive, the composition comprising a polyol-crosslinkable fluororubber, a polyol crosslinking agent and a crosslinking accelerator, wherein the polyol crosslinking agent is contained in an amount of 0.4 to 20 parts by weight per 100 parts by weight of the polyol-crosslinkable fluororubber, and wherein the weight ratio R of the crosslinking accelerator to the polyol crosslinking agent (crosslinking accelerator/polyol crosslinking agent) is in the range of 0.9 to 2.0.

11. An impact-absorbing stopper obtained by the process for producing a low-friction fluororubber crosslinked product according to claim 1.

12. A stopper in hard disk drive obtained by the process for producing a low-friction fluororubber crosslinked product according to claim 1.

13. The stopper in hard disk drive according to claim 12, wherein the stopper when used as a magnet holder-type stopper has a change of holding torque of not more than 14%.

* * * * *